United States Patent Office

2,718,483
Patented Sept. 20, 1955

2,718,483

SILOXANE RESINS CONTAINING METHYL AND PHENYL BONDED TO SILICON AND LAMINATES

Harold A. Clark, Midland, Mich., assignor to Dow Corning Corporation, Midland, Mich., a corporation of Michigan No Drawing. Application February 3, 1953,
Serial No. 334,971

3 Claims. (Cl. 154—43)

This invention relates to new and useful siloxane resins. Specifically, this invention is concerned with organopolysiloxane resinous compositions consisting essentially of 4.5 to 17 mol per cent diphenylsiloxane, 22 to 55 mol per cent monophenylsiloxane, and 40 to 65 mol per cent mono-methylsiloxane.

Organosilicon resins have become well-known and widely used as laminating resins in industry. They are characterized generally by excellent electrical properties and high heat stability, the latter characteristic particularly differentiating them from organic resinous materials. Some of the known organosilicon resin compositions presently available are suitable for low-pressure laminating operations, but unfortunately, the laminates or articles formed therefrom are characterized by such low mechanical strength, especially at high temperatures, that they are useless for most commercial applications. Some of the presently known silicone resin compositions form excellent laminates with, say, glass cloth, when molded at high pressures (i. e. about 1,000 p. s. i.). However, these resins will not produce laminates when molded at low pressure (i. e., 30 p. s. i. or less). The value of forming laminates at low pressure lies chiefly in the fact that it allows contour molding (i. e., the molding of curved and irregular shapes). These shapes cannot be formed at high pressure. Thus, the resinous compositions of this invention make it possible for the first time to prepare commercially acceptable low-pressure silicone resin laminated articles.

It is the object of this invention to prepare resin compositions which are suitable for either high- or low-pressure laminating operations. Another object is to provide silicone laminates which have flexural strengths heretofore unrealized.

Low-pressure laminates prepared with the organosilicon resins of this invention have mechanical strengths greater than high-pressure laminates prepared from heretofore known organosilicon resins. The improvements effected by using the compositions of this invention are obtained without sacrifice of other physical properties such as dielectric strength.

The advantages of the compositions of this invention are pronounced at elevated temperatures. For example, the flexural strengths at 260° C. of laminates using the resins of this invention are nearly twice those obtained using previously known silicone resins. This is important, since silicone resins are normally employed at temperatures above 150° C. Furthermore, the room temperature strength of laminates prepared from the instant compositions does not deteriorate substantially after prolonged aging at 250° C.

The compositions of this invention are prepared by employing conventional and well-known means of cohydrolysis and co-condensation of hydrolyzable monomethyl, monophenyl, and diphenyl silanes. Thus, $(CH_3)SiCl_3$, $C_6H_5SiCl_3$, and $(C_6H_5)_2SiCl_2$ may be separately hydrolyzed and then the resulting siloxanes cocondensed, or these silanes (in proper proportion) may be cohydrolyzed and then further condensed to yield the resins of this invention. It is to be understood that other silanes such as the alkoxy silanes, may be employed in lieu of the above halogenosilanes. Co-condensation of the above siloxanes is best carried out in the presence of conventional siloxane resin catalysts such as metal salts of carboxylic acids and quaternary ammonium salts.

Laminates prepared from the resins of this invention are made employing conventional procedures. For example, a fabric may be dip impregnated with resin solution, air dried, and pre-cured at about 110° C. to reduce resin flow, molded to desired shape under heat and pressure, and then after-baked to obtain desired properties. Silicone resin laminates of glass cloth are ordinarily afterbaked for 12 to 48 hours at 250° C. In order to hasten the cure time of the resin during molding, catalysts may be added to the resins of this invention. Suitable catalysts include metal salts of carboxylic acids such as zinc octoate or potassium acetate.

The compositions of this invention and the preparation thereof are amply illustrated in the following examples. It is to be understood, however, that no limitation is to be implied therefrom. The scope of this invention is specifically and correctly set forth in the claims. The flexural strength values of all laminates were determined in accordance with Federal Specification for Plastics, LP–406A.

*Example 1*

A mixture of 65 mol per cent methyltrichlorosilane and 35 mol per cent phenyltrichlorosilane was hydrolyzed in a cold water-toluene mixture to give a 27 per cent by weight toluene solution of a resinous copolymer of monomethylsiloxane and monophenylsiloxane (i. e., resin hydrolyzate).

To 900 grams of the above resin (in the form of a 27 per cent by weight solution in toluene) was added 100 grams of diphenylsilanediol. The mixture was vacuum-stripped to 70 per cent solids. After stripping, the condensing catalyst, zinc octoate, was added in amount sufficient to give 0.1 per cent zinc based on the total resin weight. The mixture was heated at reflux for 3 hours, then cooled, filtered, and diluted to 60 per cent solids in toluene. The resulting resinous copolymer had a composition of 4.7 mol per cent diphenylsiloxane, 62 mol per cent monomethylsiloxane, and 33.3 mol per cent monophenylsiloxane.

To this resin copolymer dissolved as 60 per cent solids was added a condensing catalyst, trimethyl (beta-hydroxyethyl) ammonium 2-ethyl hexoate in amount of 0.22 per cent by weight based upon resin weight. A laminate of glass cloth and the above resin was formed in the following manner.

Commercial heat-cleaned glass cloth designated as ECC 181 was dip impregnated to 35 per cent resin (based on total weight of cloth and resin). The impregnated glass cloth was air dried for one half hour and pre-cured at 110° C. 14 layers of this pre-cured impregnated cloth were stacked to give a laminate. This laminate was heated for 30 minutes in a press at 175° C. under a pressure of 30 pounds per square inch. The resulting ⅛" thick laminate was removed from the press and baked as follows: for two hours at 125° C., two hours at 150° C., two hours at 175° C., and two hours at 200° C. At the end of this heating, it contained 30 per cent by weight resin and 70 per cent glass cloth. The laminate was tested by baking at 250° C. in an air oven. After 24 hours, the laminate was found to have a flexural strength at 260° C. of 18,000 p. s. i. After 125 hours, it had flexural strengths of 18,200 p. s. i. at 260° C. and 44,250 p. s. i. at room temperature.

A ⅛" laminate was prepared in identical manner using a commercially available low-pressure laminating resin having a composition of 34 mol per cent monomethylsiloxane, 38 mol per cent monophenylsiloxane and 28 mol per cent dimethylsiloxane. After 24 hours at 250° C., the flexural strength at 260° C. was 8,500 p. s. i. After 125 hours at 250° C., it had flexural strengths of 12,500 p. s. i. at 260° C. and 30,000 p. s. i. at room temperature.

*Example 2*

Following the procedure of Example 1, a resin copolymer having the composition of 10 mol per cent diphenylsiloxane, 58.5 mol per cent monomethylsiloxane, and 31.5 mol per cent monophenylsiloxane was obtained by co-condensing 800 g. of a methyltrichlorosilane-phenyltrichlorosilane cohydrolyzate and 200 g. of diphenylsilicondiol in the presence of 0.1 per cent zinc (added as the octoate) based on resin weight. A one-eighth inch thick 14 ply laminate of the glass cloth was prepared employing the above resin catalyzed with 0.27 per cent trimethyl (beta-hydroxy-ethyl) ammonium 2-ethyl hexoate, following the procedure used in Example 1. This laminate, after aging for 125 hours at 250° C. was found to have a room temperature flexural strength of 42,500 p. s. i., and a flexural strength at 260° C. of 18,900 p. s. i.

*Example 3*

A resin copolymer consisting of 16.1 mol per cent diphenylsiloxane units, 54.5 mol per cent monomethylsiloxane units and 29.4 mol per cent monophenylsiloxane units was prepared by co-condensing 700 grams of the hydrolyzate of Example 1 and 300 grams $(C_6H_5)_2Si(OH)_2$. ECC 181 glass cloth was laminated with this resin utilizing the procedure of Example 1, except that in the laminating step, the catalyst was 0.27 per cent trimethyl (beta-hydroxyethyl) ammonium 2-ethyl hexoate. After 125 hours aging at 250° C., the ⅛ inch thick, 14 ply laminate had a flexural strength of 46,800 p. s. i. at room temperature and 16,000 p. s. i. at 260° C.

*Example 4*

A laminating resin having a composition of 58 mol per cent monomethylsiloxane, 35 mol per cent monophenylsiloxane, and 7 mol per cent diphenylsiloxane was prepared in the following manner. 520 grams of $CH_3SiCl_3$, 443.6 grams of $C_6H_5SiCl_3$, and 101.7 grams of $(C_6H_5)_2SiCl_2$ were added to a 5 liter reactor and 300 grams of isopropanol were slowly added over a period of 9 hours. The mixture of alkoxylated silanes was transferred to a separatory funnel and diluted with 600 grams of toluene and added slowly to a hydrolysis medium consisting of hot water, isopropanol, and toluene. After hydrolysis, the resin layer was transferred to a 5 liter reactor, admixed with 50 grams of calcium carbonate, stirred for 15 minutes, filtered, and vacuum stripped to 64 per cent solids. Laminates prepared from this resin were easily molded at low pressure (e. g. 30 p. s. i.) and were characterized by excellent flexural strength.

*Example 5*

Employing the procedure used in Example 4, a resin copolymer consisting of 60 mol per cent monomethylsiloxane, 15 mol per cent diphenylsiloxane and 25 mol per cent monophenylsiloxane was prepared. This resin was found very effective for making low or high pressure laminates with glass cloth or molded articles containing asbestos, mica, or glass flock.

That which is claimed is:

1. An organosilicon resin copolymer consisting essentially of 4.5 to 17 mol per cent diphenylsiloxane units, 22 to 55 mol per cent monophenylsiloxane units, and 40 to 65 mol per cent monomethylsiloxane units.

2. An article of manufacture comprising fabric impregnated with the composition of claim 1.

3. A laminated article comprising at least two layers of fibrous material impregnated and bonded with the composition of claim 1.

References Cited in the file of this patent

UNITED STATES PATENTS

| | | |
|---|---|---|
| 2,258,222 | Rochow | Oct. 7, 1941 |
| 2,442,212 | Rochow | May 25, 1948 |
| 2,504,388 | Braley | Apr. 18, 1950 |
| 2,518,160 | Mathes | Aug. 8, 1950 |

FOREIGN PATENTS

| | | |
|---|---|---|
| 133,541 | Sweden | Nov. 6, 1951 |